United States Patent [19]
Son et al.

[11] Patent Number: 5,917,459
[45] Date of Patent: Jun. 29, 1999

[54] HOLOGRAPHIC HEAD UP DISPLAY

[75] Inventors: Jung Young Son, Seoul, Rep. of Korea; Vadim V. Smirnov, St. Petersburg, Russian Federation

[73] Assignee: Korea Institute of Science and Technology, Seoul, Rep. of Korea

[21] Appl. No.: 08/784,534

[22] Filed: Jan. 17, 1997

[30] Foreign Application Priority Data

Sep. 7, 1996 [KR] Rep. of Korea ........................ 96-38808

[51] Int. Cl.[6] .................................................. G09G 5/00
[52] U.S. Cl. .................................. 345/7; 345/8; 359/13; 359/15; 359/20; 340/980
[58] Field of Search ............................. 345/7, 8; 359/13, 359/14, 15, 16, 20; 340/980

[56] References Cited

U.S. PATENT DOCUMENTS

| | | | |
|---|---|---|---|
| 4,763,990 | 8/1988 | Wood | 350/230 |
| 5,037,166 | 8/1991 | Malcolm et al. | 359/15 |
| 5,526,145 | 6/1996 | Weber | 359/15 |
| 5,589,956 | 12/1996 | Morishima et al. | 359/15 |

*Primary Examiner*—Jeffery A. Hofsass
*Assistant Examiner*—Julie Lieu
*Attorney, Agent, or Firm*—Oblon, Spivak, McClelland, Maier & Neustadt, P.C.

[57] ABSTRACT

A color holographic head up display which can be mounted on, for example, an airplane or automobile for projecting a color image displayed on a screen. The color holographic head up display in accordance with the present invention comprises an information display comprising a 2-dimensional array of pixels for displaying information to be projected, a relay optical system for relaying an image displayed on the information display, and a holographic combiner having holographic optical elements whose number is the same as the number of the pixels of the information display for delivering the image from the relay optical system to the viewing zone of the human eye, the holographic optical elements being arranged to correspond to the pixels of the information display. According to the present invention, the surrounding scenery and navigation information of a color image are simultaneously projected without noise due to intermodulation, and a high diffraction efficiency can be achieved.

7 Claims, 5 Drawing Sheets

HOLOGRAPHIC HEAD UP DISPLAY

BACKGROUND OF THE INVENTION

1. Field of the Invention

The present invention relates generally to a head up display, and more particularly, to a color holographic head up display mounted on an airplane or automobile for projecting a color image displayed on a screen so that the navigator can see it along with the surrounding scenery.

2. Description of the Related Art

A holographic head up display is a kind of image projection apparatus which comprises a display plate such as a CRT or LCD (liquid crystal display) for displaying an image to be projected, a relay optical system for delivering the displayed image, and a holographic combiner which functions as an exit pupil and for redirecting the image from the relay optical system to the field of view of the navigator, thereby allowing the navigator to simultaneously see the image and the external scenery.

The head up display of an airplane utilizing the holographic combiner is well known in the art. The holographic combiner is a kind of holographic optical element which combines two different images to enable them to be seen simultaneously. The holographic combiner transmits a portion of a light as well as serving as one or more of a reflector, a spherical reflector, diffusion plate, and lens.

There are two kinds of head up displays utilizing the holographic combiner. One of them makes a projected image formed at the infinity to enable a pilot or driver to view remote objects continuously without turning his eyes elsewhere. The other head up display forms a projected image at a short distance from the pilot or driver so that the pilot or driver can obtain information necessary for navigating or driving without turning his head to a different direction from that of navigation or driving. A typical example of the head up display wherein a projected image is formed at the infinity is disclosed in U.S. Pat. No. 4,763,990.

The head up display disclosed in U.S. Pat. No. 4,763,990 will be described hereinbelow with reference to FIG. 1. FIG. 1 illustrates an optical arrangement of a holographic head up display for making a projected image formed at the infinity by utilizing a holographic combiner which serves as a spherical reflector. As illustrated in FIG. 1, the holographic head up display 100 comprises an information source 1, a relay optical system 2 for relaying the light from the information source 1, a reflector 3, and a holographic spherical reflector 5 which is a kind of holographic combiner. A CRT having a narrow spectral bandwidth may be used as the information source 1. The holographic spherical reflector 5 is made of a reflective plate transmitting the light partially or a spherical reflecting mirror. The CRT image from the information source 1 is relayed to the reflector 3 via the relay optical system 2 and then converged to the focal plane of the holographic spherical reflector 5 as a first image 4. This first image 4 is relayed to the holographic spherical reflector 5 so that a second image is formed at the infinity. The image from an exit pupil of the holographic spherical reflector 5 forms the so called viewing zone or eye box where the navigator can view remote objects through a projected image. The viewer 7 can see the second image of the CRT image and the surrounding scenery simultaneously through the eye box.

However, only the light with a small angular divergence can be collimated after reflection by the holographic spherical reflector 5 and incident upon the eye box because the holographic spherical reflector 5 has a very high angular selectivity below several degrees. Since the width of the collimated beam is lower than 10 cm and is consistent with the dimension of the image 6 of the exit pupil in a typical head up display, the viewing zone, i.e., the eye box is very narrow. In addition, only monochromatic images can be displayable since the holographic spherical reflector 5 has a high spectral selectivity, i.e., the reflection bandwidth is ordinarily within 15–30 nm. Recently, this type of head up display is rarely used because of the difficulty in manufacturing the reflection type holographic screen for viewing color images.

Next, the head up display disclosed in U.S. Pat. No. 5,037,166 wherein a projected image is formed at a short distance from the viewer will be described with reference to FIG. 2. FIG. 2 illustrates an optical arrangement of a holographic head up display for making a projected image formed around the viewer by utilizing a holographic diffusion screen 9 as a holographic combiner. The arrangement of this holographic head up display 200 is similar to that shown in FIG. 1 and thus the detailed description thereof will be omitted. The display image 8 from the information source 1 is relayed to the reflector 3 via the relay optical system 2. The relayed image is then reflected by the reflector 3 and projected to the holographic diffusion screen 9. The projected image is placed in the eye box 10 after being scattered at each point on the holographic diffusion screen 9. In this case, the size of the eye box 10 is larger than that in FIG. 1 utilizing the holographic spherical reflector as a holographic combiner. The projection of color images can be achieved when the holographic diffusion screen is used since the reflected spectral bandwidth of the holographic diffusion screen is broader than that of the holographic spherical reflector.

Although the size of the eye box of the head up display is extended by using the holographic diffusion screen, the diffraction efficiency becomes smaller with the result that the brightness of an image is reduced. In addition, scattering is increased because of the noise effect produced by the intermodulation between object beams since the diffusion screen is a hologram of the object having a diffusion surface such as a ground glass. As a result, the tone of an image is deteriorated since a halo occurs in the image displayed on the diffusion screen when the image is not projected onto the holographic diffusion screen. In general, when the holographic diffusion screen is utilized as a holographic combiner, the display of a color image is not viable due to a spectrum dispersion. Nontheless, it is theoretically possible to display color images if the spectrum dispersion can be made great. However, in this case, the diffraction efficiency is reduced.

SUMMARY OF THE INVENTION

The object of the present invention is therefore to provide a holographic head up display which provides a large eye box and a high diffraction efficiency, and displays color images without noise due to intermodulation.

In accordance with the aspect of the present invention, a color holographic head up display is provided which comprises an information display comprising a 2-dimensional array of pixels for displaying information to be projected, a relay optical system for relaying an image displayed on the information display, and a holographic combiner having holographic optical elements whose number is the same as the number of the pixels of the information display for delivering the image from the relay optical system to the viewing zone of the human eye, the holographic optical elements being arranged to correspond to the pixels of the information display.

In one preferred embodiment of the present invention, the holographic combiner further includes a transparent glass or transparent plastic substrate, and the holographic optical elements are adhered onto the transparent glass or transparent plastic substrate.

In another preferred embodiment of the present invention, the holographic optical elements selectively reflect any one of red, blue, and green spectral bandwidth lights.

In another preferred embodiment of the present invention, the size of the viewing zone is determined based on the lateral, vertical and focal length of the holographic combiner.

In still another preferred embodiment of the present invention, the relay optical system makes each pixel of the information display incident upon the corresponding holographic optical element of the holographic combiner.

BRIEF DESCRIPTION OF THE DRAWINGS

The aforementioned aspects and other features of the invention are explained in the following description, taken in conjunction with the accompanying drawings wherein.

DETAILED DESCRIPTION OF THE INVENTION

Figure 1:
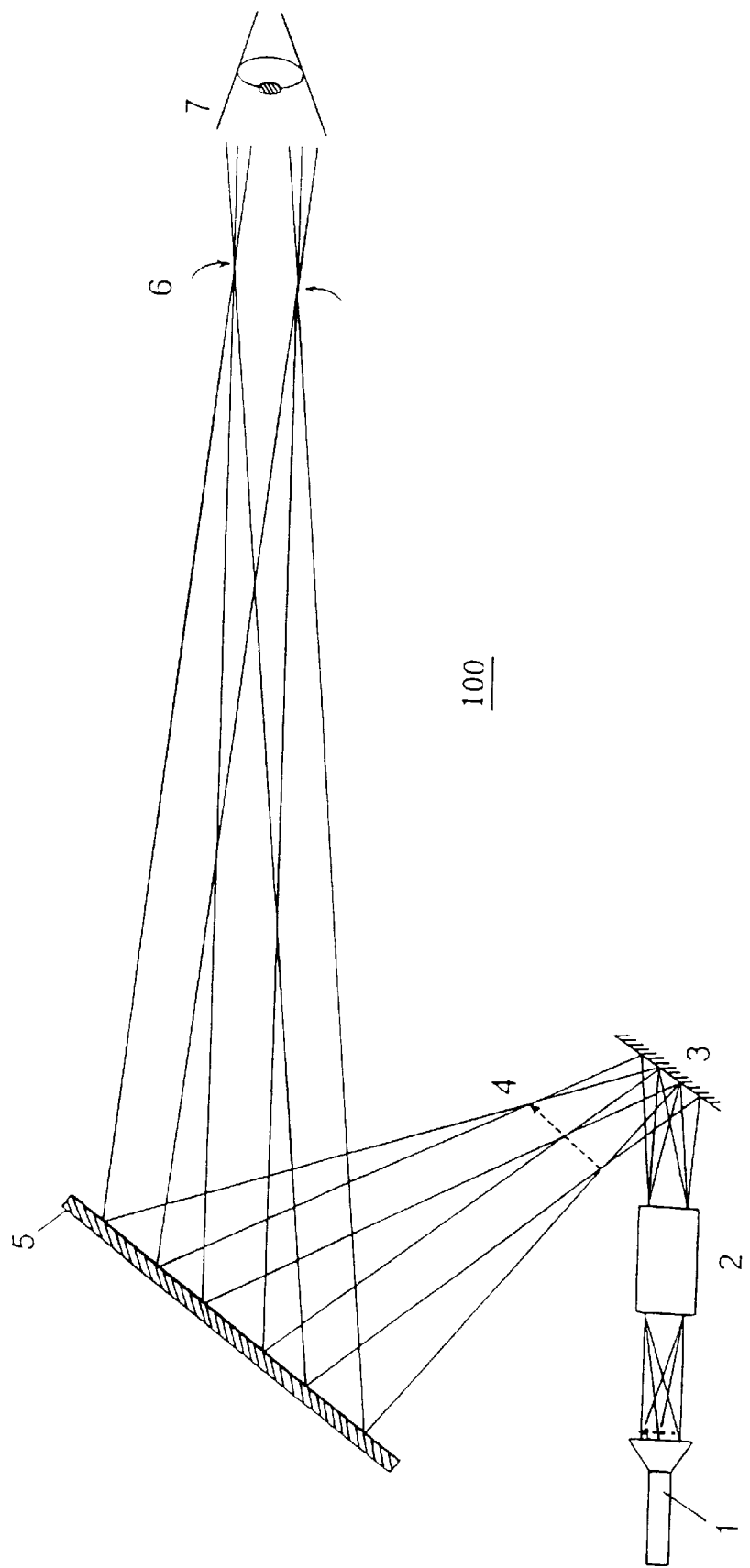
FIG. 1 illustrates an optical arrangement of a conventional holographic head up display which utilizes a spherical reflector as a holographic combiner.
Figure 2:
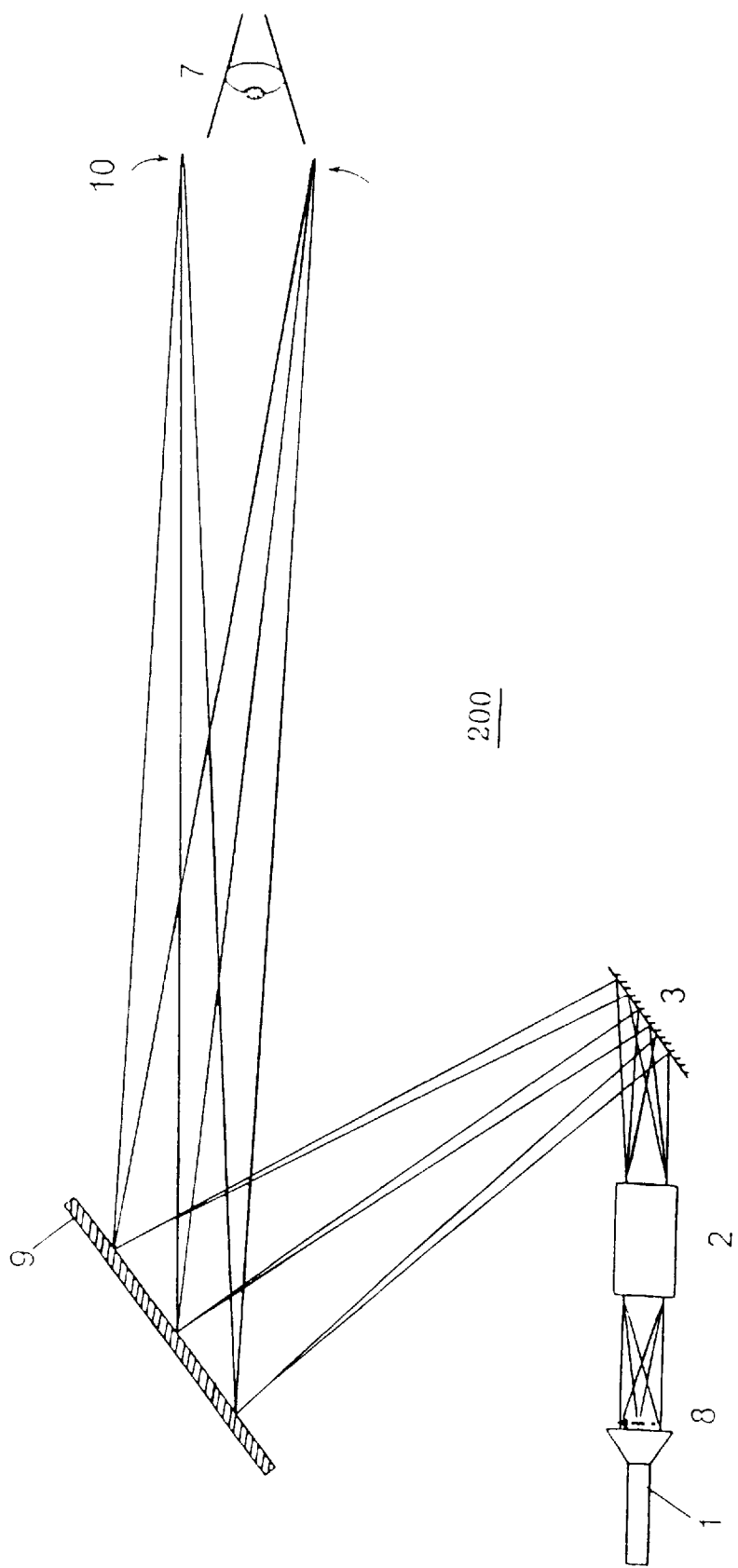
FIG. 2 illustrates an optical arrangement of a conventional holographic head up display which utilizes a holographic diffusion screen as a holographic combiner.
Figure 3:
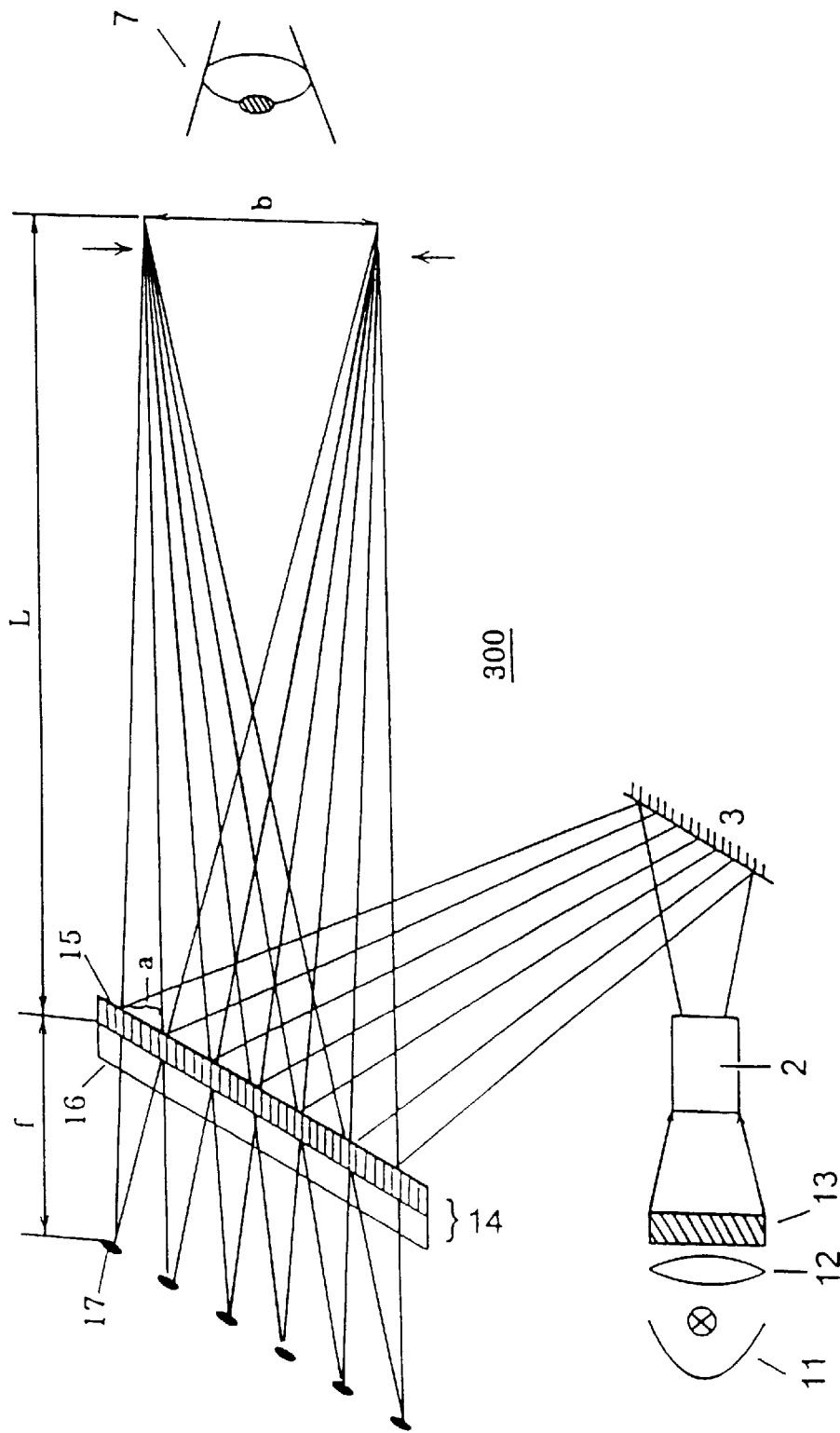
FIG. 3 illustrates an optical arrangement of a holographic head up display comprising a reflection type holographic combiner in accordance with the present invention.

Referring to FIG. 3, there is shown a color holographic head up display comprising a reflect ion type holographic combiner in accordance with the present invention. As illustrated in FIG. 3, the holographic head up display 300 comprises a light source 11, a collimator 12, an information display 13, a relay optical system 2, a reflection mirror 3, and a reflection type holographic combiner 14. A display device with a 2-dimensional pixel array such as a color LCD or color LED may be used as the information display 13. The holographic combiner 14 is comprised of a transparent glass or transparent plastic substrate 16 and a matrix array of holographic optical elements 15 adhered thereto. The number of the holographic optical elements is determined based on the resolution and the vertical and horizontal viewing angle of the viewer, and the distance between the viewer and the front window of an airplane or automobile (i.e., around the holographic combiner). Preferably, the holographic optical elements are arranged to conform in number and shape to the pixels of the information display 13. The lights from pixels constituting a color image at the information display 13 are relayed to the holographic combiner 14 via the relay optical system 2. The relayed lights are incident upon the eye box by the corresponding elements of the holographic combiner 14. There is no loss of light because each holographic optical element 15 delivers only the corresponding color of light to the eye box. Moreover, the diffraction efficiency is high, and noise due to an intermodulation is not generated because each optical element 15 does not function as a diffusion plate.

Referring again to FIG. 3, the operation of the holographic head up display 300 will be described. The light from the light source 11 is collimated by the collimator 12 and then illuminates the image displayed on the information display 13 such as a color LCD. When a color LED matrix is utilized as the information display 13, the light source 11 and collimator 12 are not required. The light from the information display 13 is relayed via the relay optical system 2 to the reflector 3. The light reflected by the reflector 3 is incident upon the holographic combiner 14. As described above, the holographic combiner 14 is preferably constructed by adhering a plurality of holographic optical elements arranged in a matrix form onto the transparent glass or transparent plastic substrate 16 so that the light reflected by the reflecting mirror 3 is incident directly upon the holographic optical elements 15 as shown in FIG. 3. With this sequence of adhesion, the holographic optical elements can be protected from the external environment. However, the sequence of adhesion can be reversed so that the light reflected by the reflecting mirror 3 is incident upon the holographic optical elements 15 through the glass or transparent plastic substrate 16.

The relay optical system 2 allows the lights from the pixels of the information display 13 to be incident upon the corresponding holographic optical elements of the holographic combiner. Each holographic optical element 15 functions as a spherical reflector in that it selectively reflects one of the spectral bandwidth lights corresponding to red, green and blue. Thus, each holographic optical element 15 allow only the light from the corresponding color pixel of the information display 13 to be incident upon the eye box 10. The holographic optical elements 15 also make a color virtual image 17 formed at some distance therefrom to the opposite side of the eye box 10. In the holographic color head up display 300, the lateral and vertical size of the eye box 10 is adjustable by the adjustment of the lateral and vertical size of the holographic optical elements 15.

Further details regarding the adjustment of the size of the eye box will be given. Assume that the virtual image 17 of the light source 11 is formed at the focal distance f from the holographic optical elements 15, the size of the holographic optical elements 15 (lateral length multiplied by vertical length) is a, the size of the eye box 10 (lateral length multiplied by vertical length) is b, and the distance between the eye box 10 and the holographic optical elements 15 is L. The size b of the eye box 10 is given by:

$$b = a \times (f+L)/f \quad \ldots (1)$$

Therefore, the lateral and vertical size of the eye box 10 can be varied by adjusting the lateral and vertical length of the holographic optical elements 15 because the size b of the eye box 10 is dependent on the size a of the holographic optical elements 15.

Figure 4:
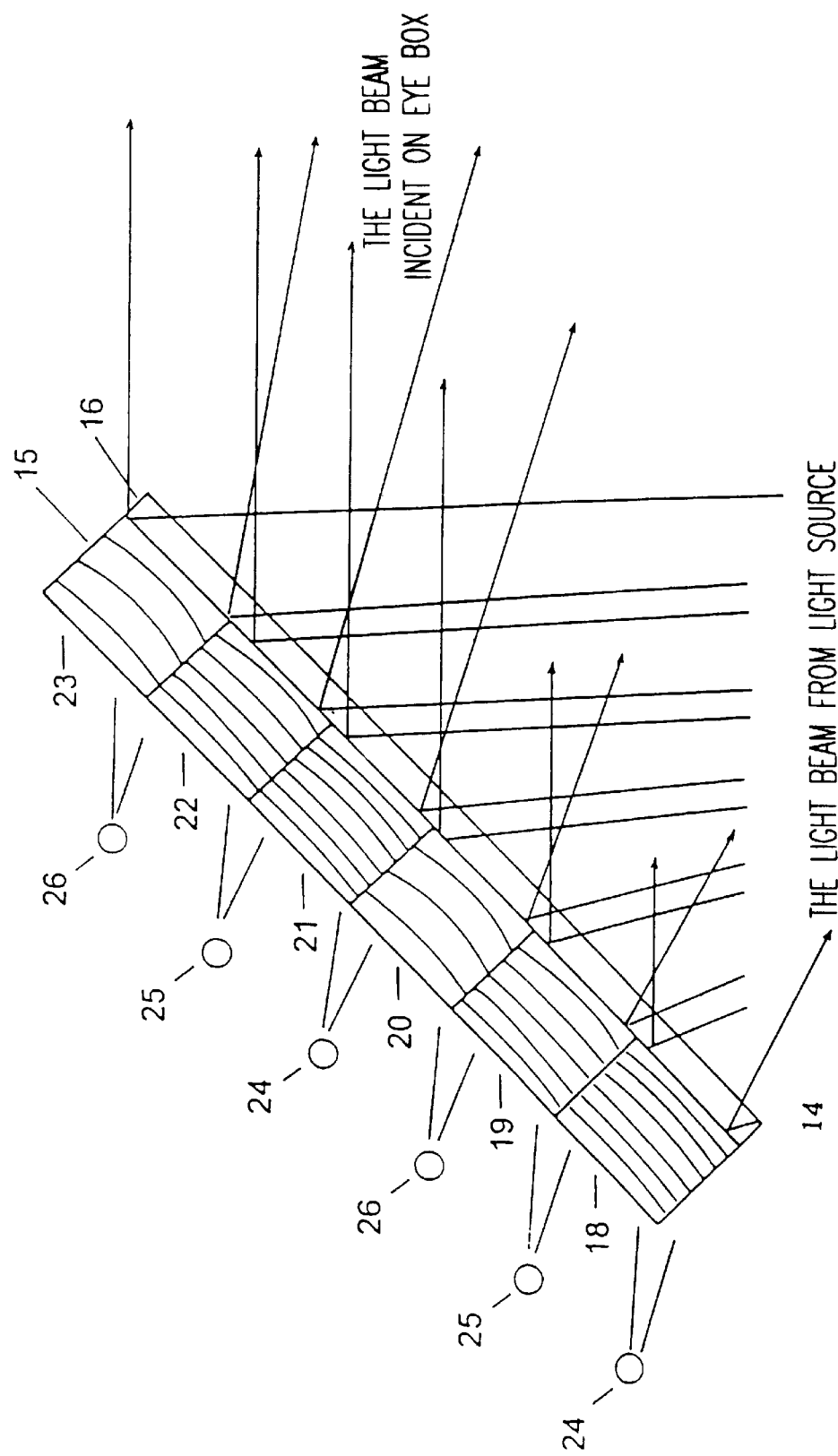
FIG. 4 illustrates a partial cross sectional view of a reflection type holographic combiner of FIG. 3 in accordance with the present invention.

FIG. 4 illustrates a partial cross sectional view of the holographic combiner in FIG. 3 taken parallel to the paper. The holographic optical elements adhered onto the transparent glass or transparent plastic substrate 16 are arranged to alternately reflect the green lights 18, 21, blue lights 19, 22 and red lights 20, 23. Each color optical element creates the corresponding virtual image, i.e., the green light image 24, blue light image 25, and red light image 26. The virtual images 24, 25, 26 are the images corresponding to the green, blue, and red pixels of the information display 13, respectively.

Figure 5:
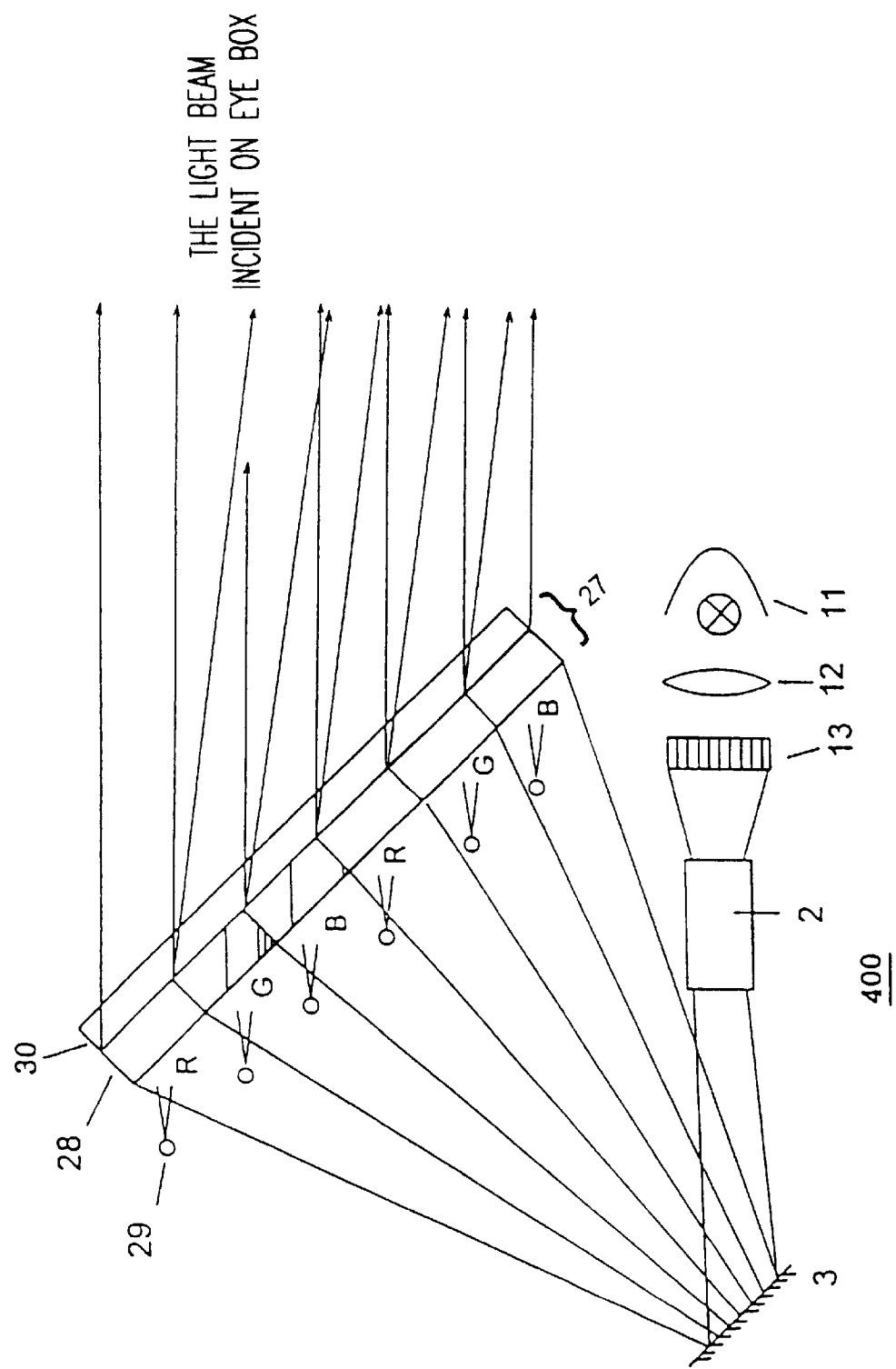
FIG. 5 illustrates an optical arrangement of a holographic head up display comprising a transmission type holographic combiner in accordance with the present invention.

The holographic head up display in accordance with the present invention can be of a transmission type. In this case, the holographic optical elements with the same optical characteristics can be utilized since each holographic optical element has poor spectral selectivity. FIG. 5 illustrates an optical arrangement of a holographic color head up display comprising a transmission type holographic combiner. The light from the light source 11 is collimated by the collimator 12 and illuminates the information display 13. The light from the information display 13 is projected to the transmission type holographic combiner 27 via the relay optical system 2 and the reflector 3. To make the transmission type holographic combiner 27, a matrix array of holographic optical elements 28 is adhered onto a transparent glass or transparent plastic substrate 30 in a similar fashion as the reflection type holographic combiner shown in FIG. 4. The relay optical system 2 projects the light from each pixel of the information display 13 to the corresponding transmission type holographic optical element 28 of the transmission type holographic combiner 27. The light transmitted through the transmission type combiner 27 is converged onto the position of the eye box (not shown). The lateral, vertical and focal length of each holographic element 28, and the spatial frequency distribution of an interference fringe of each holographic element 28 determine the direction, angular divergence, and spectral bandwidth of the light incident upon the eye box. Each holographic optical element 28 has the characteristics of a lens which allows the virtual image 29 of the corresponding pixel of the information display 13 to be formed at some distance therefrom.

Since the holographic optical elements constituting the holographic combiner of the present invention are arranged to be the same matrix form as the pixel arrangement of the information display and the holographic optical elements have the characteristics of a spherical reflector or lens, the size of the eye box becomes large, the diffraction efficiency is high and color images can be displayed without intermodulation noise.

Although, the present invention has been described with reference to a particular embodiment, the present invention is not limited to the particular embodiment. For example, the color holographic head up display according to the present invention can be directly adapted to a stop indicator for an automobile. More particularly, if the holographic head up display according to the present invention is applied to the stop indicator, a complex pattern of characters or a diagram can be displayed in contrast to the conventional types of stop indicators which renders only monochromatic signals such as red or blue. It will be appreciated by those skilled in the art that such application will be easily implemented.

Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A holographic head up display, comprising:

an information display comprising a 2-dimensional array of pixels for displaying information to be projected;

a relay optical system for relaying an image displayed on said information display; and a holographic non-diffusive combiner having holographic optical elements whose number is the same as the number of the pixels of said information display for delivering the image from said relay optical system to the viewing zone of the human eye, the holographic optical elements being arranged to correspond to the pixels of said information display.

2. The display of claim 1, wherein said holographic combiner further includes a transparent glass or transparent plastic substrate, and the holographic optical elements are adhered onto the transparent glass or transparent plastic substrate.

3. The display of claim 1, wherein the holographic optical elements selectively reflect any one of the lights of the red, blue, and green spectral bandwidths.

4. The display of claim 1, wherein the size of the viewing zone is determined based on the lateral, vertical and focal length of said holographic optical element.

5. The display of claim 1, wherein said relay optical system makes each pixel of said information display incident upon the corresponding holographic optical element of said holographic combiner.

6. The display of claim 1, wherein the holographic optical elements have the characteristics of a lens or mirrors.

7. The use of the holographic head up display defined in claim 1 as a stop indicator of an automobile.

* * * * *